United States Patent [19]

Yu

[11] Patent Number: 4,931,506
[45] Date of Patent: Jun. 5, 1990

[54] ETHYLENE OXIDE/EPIHALOHYDRIN COPOLYMER ANTISTATIC ADDITIVE FOR CHLORINE-CONTAINING POLYMERS

[75] Inventor: Simon H. Yu, Westlake, Ohio

[73] Assignee: The B. F. Goodrich Company, Akron, Ohio

[21] Appl. No.: 220,031

[22] Filed: Jul. 15, 1988

Related U.S. Application Data

[63] Continuation-in-part of Ser. No. 28,648, Mar. 20, 1987, abandoned.

[51] Int. Cl.$^5$ .................. C08L 27/06; C08L 27/08
[52] U.S. Cl. ................................. 525/187; 528/419; 528/421
[58] Field of Search ................. 528/419, 421; 525/187

[56] References Cited

U.S. PATENT DOCUMENTS

| 3,158,581 | 11/1964 | Vandenberg | 528/419 |
| 3,425,981 | 2/1969 | Puletti et al. | 524/586 |
| 4,230,827 | 10/1980 | Myers | 525/121 |
| 4,588,773 | 5/1986 | Federi et al. | 525/187 |

FOREIGN PATENT DOCUMENTS 1907024 4/1971 Fed. Rep. of Germany .

*Primary Examiner*—John C. Bleutge
*Assistant Examiner*—Robert E. L. Sellers, II
*Attorney, Agent, or Firm*—Nestor W. Shust

[57] ABSTRACT

An antistatic additive for PVC, or other chlorine containing polymers, or polystyrene and/or other styrene containing polymers, including but not limited to polymers of styrene and acrylonitrile, such as ABS (acrylonitrile-butadiene-styrene) or mixtures thereof and blends of any of these, wherein the antistatic additive includes, at least in part, ethylene oxide and epihalohydrin. The antistatic additive is semicrystalline, and the ethylene oxide component is in a range of from about 60% to 95% by weight, preferably 80% to 95% by weight, and the epihalohydrin component is in a range of from about 5% to about 40% by weight, preferably 5% to 20% by weight. Optionally, up to 25% of the additive can include, as a replacement for epihalohydrin, one or more 1,2-epoxides. The semicrystalline antistatic additive is employed in a range of from about 3% to about 35%, preferably from about 3% to 20% by weight and the polymeric materials mentioned above are employed in a range of from about 65% to about 97% and preferably from about 80% to about 97% by weight. The semicrystalline antistatic additive of ethylene oxide and epihalohydrin are found to be superior to commercially available antistats for PVC, other chlorine containing polymers, or polystyrene and/or other styrene containing polymers, including but not limited to polymers of styrene and acrylonitrile, such as ABS (acrylonitrile-butadiene-styrene) or mixtures thereof, and mixtures of any of the above.

12 Claims, No Drawings

ETHYLENE OXIDE/EPIHALOHYDRIN COPOLYMER ANTISTATIC ADDITIVE FOR CHLORINE-CONTAINING POLYMERS

This is a continuation-in-part application of application Ser. No. 028,648 filed on Mar. 20, 1987, now abandoned.

BACKGROUND OF THE INVENTION

(1) Field of the Invention

The present invention relates to the use of a polymer of ethylene oxide and epihalohydrin as an antistatic additive for polymeric materials consisting of PVC (polyvinyl chloride) and/or other chlorine containing polymers, or polystyrene and/or other styrene containing polymers, including but not limited to polymers of styrene and acrylonitrile, such as ABS (acrylonitrile-butadiene-styrene), or blends of the polymeric materials. In particular, the present invention relates to a semi-crystalline antistatic additive containing at least 60% by weight and preferably at least 80% by weight of ethylene oxide with the remainder being epihalohydrin. The present invention also relates to a process for manufacturing an antistatic polymeric material consisting of PVC and/or other chlorine containing polymers, or polystyrene and/or other styrene containing polymers.

(2) Prior Art

The retention and amplification of charges of static electricity on the surface of most plastics, and particularly PVC and ABS, is well known. Plastic materials have a significant tendency to accumulate static electrical charges during processing operations such as milling, calendering, extruding, etc. A sudden discharge of static electrical charges in the form of an electrical arc is not only a fire hazard, but personnel handling the process plastic are exposed to electrical shock. Furthermore, the presence of static electrical charges on sheets of thermal plastic, for example, can cause the sheets to adhere to one another, thus making the separation for further processing more difficult. Moreover, the presence of static electrical charges during manufacturing causes dust to adhere to the molded sheet which results in a coarse surface requiring additional costly polishing operations for forming articles of manufacturing.

To prevent static electrical charges from accumulating during the manufacturing of plastic, during formation of articles of manufacture, and during the useful life of the various articles of manufacture, it is well known to employ various types of antistatic agents by incorporating the agents into the plastic during processing. However, the incorporation of the antistatic agents into various plastics creates many problems. For example, the majority of antistatic agents cannot withstand high temperatures and are destroyed or rendered useless with respect to their antistatic abilities during the hot temperature processing required in conventional molding and fabricating steps for forming articles of manufacture. A majority of the antistatic agents are also either cationic or anionic. They tend to cause the degradation of the resins, particularly PVC and ABS, at hot processing temperatures resulting in discoloration or loss of physical properties. Still other antistatic agents are subject to blooming and frequently leave a coating on the surface of the molds, destroy the surface finish on the articles of manufacture, and reduce the dimensional stability when exposed to heat. In severe cases, the surface of the article of manufacture becomes quite oily and marbleized. The most serious problem of antistatic agents is the loss of original physical properties of the resins they incorporate.

Prior to the present invention, the conventional thinking was that a high molecular weight antistatic agent does not have good antistatic qualities and characteristics as compared to low molecular weight antistatic agents. Moreover, prior thinking was that a high molecular weight polymeric antistatic agent would impair the physical properties of the resins employed therewith, since compatability between two polymeric materials is exceptional rather than common. It is further known that the incorporation of an incompatible material into a resin would cause the loss of physical properties. Exemplary of such prior art is the following patents.

German Offenlegungsschrift No. 1,907,024 having a publication date of Apr. 15, 1971 discloses molding compounds based on vinyl chloride polymers in which a "non-crystalline" elastomeric copolymer of epichlorohydrin and ethylene oxide is employed in PVC, for example, to provide uniform gelling, to provide thermal softening, to provide adequate flow-ability at low temperature, to provide high heat resistance and transparency, to provide mechanical strength and most importantly to improve impact strength. This reference does not recognize the use of copolymers of epihalohydrin and ethylene oxide as antistatic agents. Additionally, the reference states that when less than 30% by weight of epihalohydrin is used, the copolymer is characterized by "poor compatability," and the resulting compound has "insufficient impact resistance".

U.S. Pat. No. 4,588,773 to Federal et al. discloses an antistatic thermoplastic composition wherein the thermoplastic is ABS and the antistatic agent is an epihalohydrin copolymer which includes from about 25% to about 75% by weight epihalohydrin and from about 75% to about 25% alkylene oxide such as ethylene oxide. More preferably, the copolymer includes about 40% to about 60% by weight epichlorohydrin and about 60% to about 40% by weight of alkylene oxide. However, the only copolymer tested in the examples was "a 50/50 copolymer of epihalohydrin and ethylene oxide." A 50/50 copolymer of epihalohydrin and ethylene oxide is amorphous and rubbery. In order for meaningful antistatic properties to exist in the ABS thermoplastic, the patent teaches one to include more than 20% by weight of the epihalohydrin copolymer antistat based upon the combined copolymer and thermoplastic material. In the preferred embodiment, the epichlorohydrin and the alkylene oxide are copolymerized to form an "epichlorohydrin rubber" prior to combination with the ABS resins. It is very difficult to handle the rubbery amorphous) antistatic copolymer as an additive for plastics, particularly in a continuous and automatic process, specifically when weighing and feeding the additive automatically. Furthermore, rubbery crumbs are generally more difficult to disperse into plastics than powders.

A solid, rubbery, essentially wholly amorphous copolymer of epichlorohydrin and ethylene oxide was disclosed in U.S. Pat. No. 3,158,581 to Vandenberg and a process of polymerizing epichlorohydrin and ethylene oxide with an organo-aluminum compound was disclosed in U.S. Pat. No. 3,135,705 to Vandenberg.

A coordination catalyst based on an organoaluminum compound as described in U.S. Pat. Nos. 3,219,591 and 3,642,667 was found to be suitable for the preparation of high molecular weight semicrystalline antistatic copolymers of epichlorohydrin and ethylene oxide in high yield. U.S. Pat. No. 3,219,591 discloses a coordination catalyst system by reacting a trialkylaluminum in the presence of an ether with water and optionally a chelating agent such as acetylacetone (AcAc). U.S. Pat. No. 3,642,667 discloses an improved catalyst by further reacting the above mentioned catalyst with an ether alcohol such as tetrahydrofurfuryl alcohol. It has been found that a chelating agent is essential for the copolymerization of ethylene oxide and epichlorohydrin, although a chelating agent is optional for the homopolymerization of epichlorohydrin.

U.S. Pat. No. 4,304,902 to Landoll discloses a copolymer consisting of 96 to 99.9% by weight of ethylene oxide and 4 to 0.1% by weight of a long chain alkylene oxide. The patent states that the copolymers are important items of commerce useful as detergents and surfactants. This reference does not recognize the use of the copolymer as an antistat for plastics. In particular, the reference does not recognize the copolymer as an antistatic agent for either ABS or PVC.

It is a chief aim of the present invention to provide an antistatic agent for PVC or ABS which has improved antistatic properties over other epihalohydrin copolymer antistats.

It is another aspect of the present invention to provide an antistatic agent comprising a polymer of ethylene oxide and epihalohydrin.

It is a further aim of the present invention to provide an antistat consisting of a copolymer containing greater than 60% by weight and preferably at least 80% by weight of ethylene oxide with a remainder being epihalohydrin.

It is another feature of the present invention to provide a new class of antistatic agents based on semicrystalline polymers of epihalohydrin and ethylene oxide.

It is another aim of the present invention to provide an antistat for polymeric material consisting of PVC and/or other chlorine containing polymers, or for polystyrene and/or other styrene containing polymers, and blends of the polymeric materials.

It is another aim of the present invention to set forth a process of preparing antistatic PVC or ABS by incorporating an ethylene oxide/epihalohydrin polymer.

SUMMARY OF THE INVENTION

The present invention provides improved antistatic properties for polymeric materials, namely PVC and/or other chlorine containing polymers, or for polystyrene and/or other styrene containing polymers, including but not limited to polymers of styrene and acrylonitrile, such as ABS (acrylonitrile-butadiene-styrene), or blends of the polymeric materials, without impairing the mechanical properties and thermal stability. The antistatic protection for the polymeric material is provided by employing a semicrystalline polymer of ethylene oxide and epihalohydrin wherein the ethylene oxide is at least 60% by weight and preferably at least 80% by weight of the polymer.

Semicrystalline polymers of ethylene oxide and epihalohydrin with at least 60% and preferably at least 80% by weight of ethylene oxide show a significant improvement in antistatic properties of PVC and ABS resins and their related resins. In particular, the antistatic properties are an improvement over those amorphous or elastomeric (rubbery) polymers employed as antistatic agents containing greater than 40% by weight of epihalohydrin. The significant improvement made by increasing the amount of ethylene oxide in the polymer is unexpected in view of the fact that homopolymers of ethylene oxide show little or no improvement in antistatic properties compared with amorphous polymers containing a lower amount of ethylene oxide when compounded with PVC or ABS or their related resins.

In the broadest sense, the present invention is directed to a semicrystalline polymer of ethylene oxide and epihalohydrin, useful as an antistat.

In the broadest sense, the present invention relates to polymeric materials consisting of PVC and/or chlorine containing polymers, or polystyrene and/or other styrene containing polymers, or blends of the polymeric materials and an antistatic agent consisting of a semicrystalline polymer of ethylene oxide and epihalohydrirn wherein the ethylene oxide is at least 60% and preferably at least 80% by weight of the polymer.

In the broadest sense, the present invention is also directed to a method for imparting improved antistatic protection to polymeric material consisting of PVC and/or other chlorine containing polymers, or for polystyrene and/or other styrene containing polymers, or blends of the polymeric materials, by adding an effective amount of an antistatic agent consisting of a polymer of ethylene oxide and epihalohydrin, wherein the ethylene oxide is at least 60% and preferably 80% by weight of the polymer.

DETAILED DESCRIPTION OF THE PREFERRED EMBODIMENTS

By semicrystalline polymers, it is meant polymers with at least 60% and preferably 80% by weight ethylene oxide having an inherent viscosity of from about 0.2 ml/g (milliliters per gram) to about 15.0 ml/g (milliliters per gram) according to ASTM D 2857, and heats of fusion of from about 3 calories per gram to about 25 calories per gram.

By elastomeric or amorphous polymers it is meant polymers with greater than 40% by weight of epihalohydrin.

Antistatic polymers of this invention contain 5% to 40% and preferably 5% to 20% by weight of epihalohydrin and 95% to 60% preferably 95% to 80% by weight of ethylene oxide, and optionally up to 25% by weight of a third 1,2-epoxide monomer to replace epichlorohydrin, most preferably propylene oxide. The preferred polymers are copolymers containing about 10% to 35% and preferably 5% to 20% by weight of epihalohydrin and from 90% to 65% and preferably from 95% to 80% by weight of ethylene oxide. The preferred copolymers have a molecular weight of about 50,000 to 800,000 although molecular weight can range from about 20,000 to about 2,000,000. The preferred copolymers have an inherent viscosity of about 0.5 ml/g (milliliters per gram) to 6.0 ml/g (milliliters per gram) although the inherent viscosity can range from about 0.2 ml/g (milliliters per gram) to about 15 ml/g (milliliters per gram) as determined on a solution made with 0.25 grams of the copolymer in 100 grams of toluene at 25° C. according to ASTM D2857.

Temperature dependent viscoelastic properties of the antistatic copolymers were examined with a Rheometrics mechanical spectrometer. The antistatic copolymers of this invention display a sharp transition in physical properties at temperatures from 35° to 65° C. with melting temperatures from about 45° to about 70° C., and with a crystallinity index from about 5 to 40% as determined by X-ray diffraction analysis. Both the complex viscosity and the storage modulus undergo very rapid reductions in magnitude with increasing temperature. Also, the loss modulus displays a sharp maximum. This behavior is characteristic of the melting of the well-defined crystalline domains of thermoplastics. At a temperature above 70° C., the copolymer behavior is characteristically elastomeric, and the decrease of complex viscosity and storage modulus becomes less sensitive to temperature increase and the loss tangent is less than one.

On the other hand, for example, an amorphous epichlorohydrin/ethylene oxide copolymer having about 68% by weight epichlorohydrin shows no thermoplastic behavior. It shows no melting point, nor heats of fusion as determined by differential scanning colorimeter (DSC) analysis, no crystallinity as determined by x-ray analysis, no sharp reduction of the complex viscosity or the storage modulus, nor is a sharp maximum of the loss modulus for the entire temperature range tested for the viscoelastic properties evident.

Because of the thermoplastic behavior of the copolymer of the present invention at room temperature, the copolymers can be manufactured into powders or pellets which have great advantages, namely, easier control in handling as additives for plastics as opposed to amorphous materials or liquids, particularly in a continuous and automatic process.

Suitable epihalohydrins to be used in the antistatic polymer of the present invention consists of epichlorohydrin, epibromohydrin, and epiiodohydrin, with epichlorohydrin being especially preferred. Exemplary of 1,2-epoxides as the optional third monomer are: 1,2-epoxypropane (propylene oxide), 1,2-epoxybutane; 1,2-epoxypentane; 1,2-epoxyhexane; 1,2-epoxyheptane; 1,2-epoxydeoane; 1,2-epoxydodecane; 1,2-epoxyoctadecane; 7-ethyl-2-methyl-1, 2-epoxyundecane; 2,6,8-trimethyl-1, 2-epoxynonane; styrene oxide; 3-chloro-1,2-epoxybutane; 3,3-dichloro-1, 2-epoxypropane; 3,3,3-trichloro-1,2-epoxypropane; 3-bromo-1,2-epoxybutane; 3-fluoro-1,2-epoxybutane; 3-iodo-1,2 epoxybutane; ethyl glycidyl ether; n-butyl glycidyl ether; isobutyl glycidyl ether; t-butyl glycidyl ether; n-hexyl glycidyl ether; 2-ethylhexyl glycidyl ether; heptafluoro-isopropyl glycidyl ether; phenyl glycidyl ether; 4-methyl phenyl glycidyl ether; benzyl glycidyl ether; 2-phenyl ethyl glycidyl ether; allyl glycidyl ether; glycidyl acrylate; and the like, and mixtures thereof. The most preferable optional third monomer is propylene oxide.

Copolymerization of epihalohydrin and particular epichlorohydrin is carried out using a coordination catalyst system based on an organo-aluminum compound in anhydrous conditions under nitrogen preferably with an inert diluent. The polymerization process may be conducted as a batch or continuous process with the catalyst, monomers, and the inert diluent added simultaneously or incrementally during the polymerization, or continuously throughout the polymerization. The epihalohydrin and one more comonomers are preferably added to the reaction vessel simultaneously or as a mixture, or premixed with the inert diluent before addition to the reactor, resulting in random copolymerization.

Any diluent that is inert under the polymerization conditions may be used. For example, toluene, benzene, heptane, hexane, butane, cyclohexane, diethyl ether, chlorobenzene, methylene chloride, and ethylene dichloride are generally acceptable diluents. Obviously, any mixture of such diluents may also be employed and in many cases may be preferable depending upon the conditions and the particular monomers employed.

Depending upon the solubility of the monomers in the diluent, copolymerization could be solution polymerization or slurry polymerization. The copolymerization process can be carried out over a wide range of temperatures and pressures. Generally, copolymerization should be carried out from a temperature from about −58° C. to about 200° C. and more preferably within the range from about −30° C. to about 150° C., and most preferably from about 60° C. to about 120° C. The copolymerization temperature can be controlled by employing a cooling jacket, heating, reflux heating, or a combination of the above. Usually, the copolymerization process will be carried out at superatmospheric pressure up to several hundred pounds per square inch. However, the copolymerization process may also be conducted under subatmospheric or autogenous pressures.

The antistatic polymeric materials of the present invention consist of: PVC and/or chlorine containing polymers, or polystyrene and/or other styrene containing polymers, including but not limited to polymers of styrene and acrylonitrile, such as ABS (acrylonitrile-butadiene-styrene), or mixtures thereof, comprising 65–97% by weight with the antistatic polymers of the present invention containing about 35–3% and preferably from about 20–3% by weight.

As stated above, the present invention relates to polymeric materials consisting of polystyrene and/or other styrene containing polymers, including but not limited to polymers of styrene and acrylonitrile, such as ABS (acrylonitrile-butadiene-styrene) or mixtures thereof, or PVC and/or other chlorine containing polymers, or blends of the polymeric materials, with an antistatic agent consisting of a semicrystalline polymer of ethylene oxide and epihalohydrin wherein the ethylene oxide is at least 60% and preferably 80% be weight of the polymer. The present invention also relates to a method of imparting and improving antistatic properties for polymeric material consisting of PVC and/or other chlorine containing polymers, or polystyrene and/or other styrene containing polymers, including but not limited to polymers of styrene and acrylonitrile, such as ABS (acrylonitrile-butadiene-styrene), or blends of the polymeric materials, by adding thereto an effective amount of antistatic agent consisting of a semicrystalline polymer of ethylene oxide and epihalohydrin wherein the ethylene oxide is at least 60% and preferably at least 80% by weight of the polymer.

By PVC it is meant polyvinyl chloride or its derivatives, such as chlorinated polyvinyl chloride and the like, or vinyl chloride copolymers or terpolymers having vinyl chloride as the major component monomer greater than 50% by weight. These compositions include but are not limited to comonomers of vinyl alkanoates such as vinyl acetate and the like, vinylidene halides such as vinylidene chloride, alkyl esters of carboxylic acids such acrylic acid, ethylacrylate, 2-ethylhexyl acrylate, and the like, unsaturated hydrocarbons such ethylene, propylene, isobutylene, and the like, allyl compounds, such as allyl acetate, and the like. By PVC it is also meant polymer blends, which are the physical combination of two or more polymeric resins systems, having polyvinyl chloride, or its derivates, or its copolymers, or terpolymers in concentrations greater than 20 weight percent. Examples of polymeric materials suitable to form useful polymer blends with PVC include ABS, terpolymer of acrylonitrile-styrene-acrylate (ASA), copolymer of ethylene-vinyl acetate, polyurethane, chlorinated polyethylene, polyacrylate, and nitrile rubbers. By other chlorine containing polymers, it is meant polyvinylidene chloride, chlorinated polyethylene, and the like. Additionally, PVC and other chlorine containing polymers can include plasticizers to provide flexibility, such as dioctyl phthalate, dibenzyl phthalate, butyl benzyl phthalate, hydrocarbon oils, and the like. Certain processing aids, impact modifiers, heat distortion improvers, fire retardants, and the like are often incorporated into the blends. The stabilizers which serves to prevent the breakdown of PVC are of several different types, including both varieties which stabilize against thermal and ultraviolet light oxidative degradation discoloration, and the like.

Other inclusions of the blends prepared in accordance with the present invention include lubricants, such as stearic acid, stearyl alcohol; colorants including organic dyes such as anthraquinone red, organic pigments such as phthalocyanine blue, and inorganic pigments such titanium dioxide, cadmium sulfide; fillers and particulate extenders such as carbon black, amorphous silica, asbestos, glass fibers, magnesium carbonate, and the like.

While only a few of each of the above materials have been specifically recited it is not intended to exclude others. The recitation is exemplary only and each category of additive is common and well known in the art. Each category includes extremely large numbers of material which are equally well suited for inclusion in the materials of the present invention.

Inclusion of additional material can be made at any stage during preparation in accordance with conventional techniques. Such additional materials are not of particular significance with respect to the present invention and form no part thereof.

The PVC compositions prepared in accordance with the present invention are thermoplastic, chemical resistant materials having excellent stability characteristics and are easily processed in conventional apparatus. They are particularly useful to form final articles of antistatic PVC materials by injection molding, blow molding, compression molding, extrusion, or calendering, useful as electronic housing, etc.

Although originally the term "ABS" denoted a polymer primarily constructed from acrylonitrile, butadiene and styrene, this definition has been expanded in recent years to include polymer resins in which these components have been replaced in whole or in part by similar analogous compounds. Exemplary of analogous compounds of acrylonitrile are methacrylonitrile, ethacrylonitrile, halogenated acrylonitriles, and the like; exemplary of analogous compounds of styrene are alpha-methyl styrene, chlorostyrene, vinyl toluene and the like; exemplary of analogous compounds of butadiene is isoprene, and the like. By other styrene containing polymers it is meant polystyrene modified by rubber, compounds of styrene and acrylonitrile copolymers (SAN); copolymers of styrene and acrylonitrile modified with acrylic elastomers (ASA); copolymers of styrene and acrylonitrile modified with ethylene-propylene-diene-monomer (ASE); copolymers of styrene and maleic anhydride; and the like. By ABS and other polymers containing styrene it is also meant polymer blends, which are the physical combination of two or more polymeric resins systems, having ABS and other polymers of styrene in the concentrations greater than 20 weight percent. Examples of polymeric materials suitable to form useful polymer blends include PVC, polycarbonate, nylon, polyphenylene oxide, and the like. Similar to PVC, ABS may contain various additives and fillers.

The composition of antistatic polymeric materials of the present invention can be prepared by mechanical mixing under the influence of heat and/or pressure by a variety methods. The actual method chosen will depend to some extent on the nature of the polymeric materials and on the desired final physical form of antistatic polymeric materials. Antistatic additives of this invention can be incorporated into polymeric materials together with other compounding ingredients, such as lubricants, plasticizer, stabilizer, fillers, impact modifier, and processing aid, or incorporated separately before or after polymeric materials are compounded. A well-dispersed composition is especially preferred because moldability and antistatic properties are especially enhanced and physical properties are less impaired. An ordinary mixer, such as an extruder, Banbury mixer, roll mill, or calender, can be used to incorporate antistatic additives of this invention into polymeric materials to form entirely satisfactory blends at convenient and customary operating conditions. For example, antistatic additives of this invention can conveniently be incorporated into a polymeric material by a biaxial extruder and molded or extruded directly into a final product, or it can be extruded in the form of rods which are chopped up into pellets and used in subsequent operations. Another example is to use a Banbury mixer to give a moldable composition, then the composition is rolled by a mill to form a thick sheet, and cubic pellets of the composition are subsequently obtained using a screen granulator. Final articles of antistatic materials can be formed by compression molding, injection molding, blow molding, extrusion, calendering, or the like.

The following examples are given to further illustrate the invention and should not be construed as limiting the scope of the invention.

ALL EXAMPLES

The weight percent of epichlorohydrin monomer employed in the examples in the antistatic copolymer was determined by the total chlorine analysis. Dilution Solution Viscosity (DSV) was measured at 0.25 g/100 g toluene at 25° C. according to ASTM D2857 and is referred to as inherent viscosity. DSV is related to the molecular weight of the polymer. Molecular weight of some copolymers are also determined by gel permeation chromatography (GPC) using a Water GPC Model 200 instrument at 40° C. in tetrahydrofuran (THF). Molecular weights were calibrated with respect to polystyrene. The glass transition temperature ($T_g$) and melting point ($T_m$) and heat of fusion ($\Delta H$) were measured by differential scanning calorimeter analysis with a Perkin-Elmer DSC-2, at 10° C./min. of heating or cooling rate from −28° C. to 100° C., under a 20 cc/min helium purge. Thermogravimetric analysis (TGA) was conducted on a Dupont 951 Thermogravimetric Analyzer at 10° C./min of heating rate from 30° C. to 500° C. under a 180 cc/min nitrogen purge.

Antistatic properties of the polymers were determined by surface resistivity and static decay time. Both measurements were carried out under controlled conditions at 25° C. with 50% relative humidity. Samples were also conditioned at least 48 hours prior to measurement.

Surface resistivity testing is conducted in accordance with ASTM D-257 test on an electrometer (Model 617) equipped with a high voltage supply (Model 247) and a resistivity adapter (Model 6105) all from Keithly Instruments, Inc. The adapter is composed of an upper circular electrode and a lower circular electrode encircled with a ring electrode. A sheet sample (3.5 inches in diameter and ⅛ to 1/16 inch thick) is placed between the lower and upper electrodes and a voltage of 500v was applied. The upper electrodes provides guarding; positive potential of the test voltage is applied to the lower circular electrode and negative potential is applied to the lower/encircled center electrode. After 60 seconds, the current was recorded from the electrometer and converted into surface resistivity in ohms/sq using the equation derived from the dimensions from the electrodes. Electrostatic behavior has been categorized by the Department of Defense in DOD-HDBK-263, in terms of surface resistivity. Materials with a surface resistivity in the range of $10^9$ to $10^{14}$ ohms/sq are antistatic. Materials with a surface resistivity greater than $10^{14}$ are insulative. An effective internal antistat for Department of Defense purposes will provide surface resistivities in the area labeled antistatic in the above governmental classification.

Static decay testing is carried out according to Federal Test Method Standard 101-B, Method 4046, with a static decay meter model 406C obtained from Electro Tech Systems, Inc. Static decay is a measure of the ability of a specimen, when grounded, to dissipate a known charge that has been induced on the surface of the specimen. A sheet sample (3"×6" and ⅛" to 1/16" thick) is placed between clamp electrodes contained in a Farady cage. A 5,000 v charge is applied to the surface of the specimen and the time in seconds required to dissipate the charge to 500 v (10% of its initial charge value) after a ground is provided, is then measured. Highly insulative materials will not accept a full charge of 5,000 v on their surface or show residual charge before applying the initial 5,000 v charge. In either case, the static decay testing is not applicable, and the materials are indicated in the examples as insulators. The National Fire Protection Association, NFPA Code 56-A, "Standard for the Use of Inhalation Anesthetics" cover products used in hospital operation rooms and in hazardous environments. It requires that the applied charge drop to 10% of it initial value within 0.5 seconds at 50% relative humidity in order to qualify for use in hospital operating rooms and other hazardous environments.

Generally, a more conductive material with lower surface resistivity will show better antistatic properties. However, many cases have been found where static behavior is not always related to the surface resistivity of the materials. One of the main reasons is believed that static dissipation is not only by conduction, but also by discharge of static electricity into the air.

The following physical tests are carried out in accordance with ASTM standards: Tensile, ASTM D-638; Flexural, ASTM D-790; Heat Distortion, ASTM D-648; Izod Impact, ASTM D-256; and Durometer Hardness "D", ASTM D-2240.

In all experiments except Example 10, antistats of ethylene oxide copolymers and comparative commercial antistats are mixed with thermoplastics or thermoplastic elastomers in a Brabender mixer heated with hot oil. After mixing is completed, a 6"×6"×⅛" or a 6"×8"×1/16" sheet sample was press-molded. Samples were visually examined for detrimental effects of antistats such as marbleizing or oiliness on the surface, discoloration or decomposition of polymers and brittleness.

EXAMPLE 1

Antistatic epichlorohydrin/ethylene oxide copolymers were synthesized under nitrogen in one quart conditioned beverage bottles capped with self sealing rubber gaskets and a 2-hole metal cap. Sieve dried toluene, epiohloxohydrin and ethylene oxide were added sequentially to the beverage bottles under nitrogen and polymerization was initiated by adding the catalyst and tumbling the bottles in an oil bath at 110° C. At the end of polymerization, a sample was withdrawn to measure total solids to determine the percent conversion and polymerizations were terminated with 8 ml of isopropanol and a hindered phenolic antioxidant in 6 ml of THF (tetrahydrofuran) in an amount of 0.3% by weight of the expected polymer. Heptane was then added to precipitate the polymer and the polymers were dried at 60° C. under vacuum over night. In order to obtain sufficient amounts of antistats, polymers from several duplicate bottle polymerizations were combined. For comparison, high molecular weight ethylene oxide homopolymers were also synthesized. Also in all experiments coordination catalyst solutions prepared according to U.S. Pat. No. 3,219,591 were used. The molar ratio of catalyst ingredients of triethylaluminum, anhydrous tetrahydrofuran, water, and acetylacetone (AcAc) are 1:2:0.6:0.15–0.60. The condition of preparation and characterization of the antistatic copolymers are summarized in Table I.

TABLE I

| PREPARATION AND CHARACTERIZATION OF ANTISTATIC EO/ECH COPOLYMERS | | | | | | | | | |
|---|---|---|---|---|---|---|---|---|---|
| | ANTISTAT | | | | | | | | |
| Example No. | 1A | 1B | 1C | 1D | 1E | 1F | 1G | 1H | 1I |
| PREPARATION | | | | | | | | | |
| Wt. of Toluene, g | 433.0 | 505.0 | 433.0 | 433.0 | 433.0 | 433.0 | 505.0 | 433.0 | 505.0 |
| Wt. of ECH, g | 12.5 | 22.5 | 7.5 | 9.0 | 7.5 | 7.0 | 5.0 | 2.5 | 0.0 |
| Wt. of EO, g | 12.5 | 22.5 | 17.5 | 18.0 | 17.5 | 18.0 | 40.0 | 22.5 | 45.0 |
| Catalyst, g based on neat TEAL | 1.5 | 1.5 | 1.2 | 1.5 | 1.4 | 1.5 | 1.5 | 1.4 | 1.5 |
| Pzn. Time, hr | 3 | 3 | 3 | 3 | 3 | 3 | 3 | 3 | 3 |
| Ave. Conversion, % | 62 | 68 | 77 | 70 | 68 | 72 | 89 | 93 | 100 |
| No. of Bottles | 5 | 1 | 5 | 16 | 5 | 7 | 1 | 5 | 1 |
| AcAc/TEAL | 0.30 | 0.35 | 0.30 | 0.30 | 0.38 | 0.30 | 0.35 | 0.38 | 0.35 |
| CHARACTERIZATION | | | | | | | | | |
| Wt. % of ECH in polymer | 33 | 20 | 19 | 18 | 15 | 14 | 6 | 5 | 0 |
| Mw by GPC × 1000 | n.d. | n.d. | n.d. | n.d. | 740 | n.d. | n.d. | 490 | n.d. |

TABLE I-continued

PREPARATION AND CHARACTERIZATION OF ANTISTATIC EO/ECH COPOLYMERS

| Example No. | ANTISTAT | | | | | | | | |
|---|---|---|---|---|---|---|---|---|---|
| | 1A | 1B | 1C | 1D | 1E | 1F | 1G | 1H | 1I |
| DSV | n.d. | 4.1 | n.d. | n.d. | n.d. | n.d. | 2.4 | n.d. | a |
| Gel % | n.d. | 76 | n.d. | n.d. | n.d. | n.d. | 7 | n.d. | 99 |
| DSC Analysis | | | | | | | | | |
| Tg, C. | −50 | −56 | −52 | −53 | −56 | −55 | −54 | −53 | −60 |
| Tm Peak, C | n.d. | 42 | n.d. | n.d. | n.d. | n.d. | 62 | n.d. | 77 |
| ΔHf, cal/g | n.d. | 7 | n.d. | n.d. | n.d. | n.d. | 21 | n.d. | 58 |

[a] insoluble in toluene.
n.d. = test not conducted, no data.

EXAMPLE 2

In this example, the effect of AcAc/TEAL (triethylaluminum) ratios was examined. Bottle polymerization were carried out as described in Example 1. The results are summarized in Table II. As the amount of AcAc increases, the yield of polymerization improves and the molecular weight of the polymers increase as indicated by DSV.

TABLE II

EFFECT OF ACAC/TEAL RATIO ON THE PREPARATION OF ANTISTATIC EO/ECH COPOLYMERS

| Example No. | 2A | 2B | 2C | 2D | 2E | 2F |
|---|---|---|---|---|---|---|
| PREPARATION | | | | | | |
| Wt. of Toluene, g | 505 | 505 | 505 | 505 | 505 | 505 |
| Wt. of ECH, g | 12.0 | 12.0 | 12.0 | 22.5 | 22.5 | 22.5 |
| Wt. of EO, g | 33.0 | 33.0 | 33.0 | 22.5 | 22.5 | 22.5 |
| Catalyst, g based on neat TEAL | 1.5 | 1.5 | 1.5 | 1.5 | 1.5 | 1.5 |
| Pzn. Time, hr | 3 | 3 | 3 | 3 | 3 | 3 |
| Ave. Conversion, % | 53 | 71 | 88 | 23 | 38 | 68 |
| No. of Bottles | 1 | 1 | 1 | 1 | 1 | 1 |
| AcAc/TEAL | 0.07 | 0.35 | 0.75 | 0.07 | 0.35 | 0.75 |
| CHARACTERIZATION | | | | | | |
| Wt. % of ECH in polymer | 8 | 11 | 16 | 18 | 28 | 34 |
| Mw by GPC1000 | n.d. | n.d | n.d | n.d | n.d | n.d. |
| DSV | 0.9 | 2.0 | 3.7 | 0.9 | 2.1 | 3.5 |
| Gel % | 15 | 5 | 1 | 6 | 0 | 3 |
| DSC Analysis | | | | | | |
| Tg, °C. | −58 | −54 | −55 | −47 | −53 | −53 |
| Tm Peak, °C. | 59 | 56 | 45 | n.d. | n.d. | n.d. |
| ΔHf, cal/g | 23 | 20 | 15 | n.d. | n.d. | n.d. |

EXAMPLES 3 & 4

A copolymer of EO/ECH was synthesized in a pilot plant batch scale by a slurry polymerization. A mixed solvent (200 lbs) of toluene 55% by weight) and heptane (45% by weight) along with background monomers of epichlorohydrin (5.8 lbs) and ethylene oxide (11.2 lbs) were added to a 75 gallon reactor equipped with a mechanical stirrer. The reactor was equipped with a water cooling reflux condenser and a cooling jacket. The reactor was heated to 90° C. and the pressure of the reactor was maintained at 35 psig through the reflux condenser. The catalyst with a ratio of AcAc/TEAL at 0.25 (60 lbs) in toluene was added incrementally to the reactor at about 10 min intervals. The reactor temperature was allowed to exotherm to 110° C. After all catalysts were added, mixed monomers 68 lbs) of epichlorohydrin (20% by weight) and ethylene oxide (80% by weight) was metered into the reactor at 17 lbs per hour (4 hours metering time) and the reaction temperature was maintained at 110° C. The polymerization was continued at 110° C. for one hour after all monomers were added. The resultant slurry in the reactor was then transferred to a 75 gallon blowdown tank. The reactor was flushed with mixed solvent to remove all the slurry. Then the polymerization was terminated with isopropanol (12 lbs) in the blowdown tank and mixed for 30 minutes. Five pounds of toluene containing 10 weight percent of a hindered phenolic antioxidant was added, and the slurry was stirred overnight while reactor temperature was maintained with cooling water in the jacket.

The next day, the slurry was removed from the blowdown tank, and the solvent was removed by filtering. The solid crumb was twice washed with heptane and dried at 60° C. overnight under vacuum conditions. A finished product was obtained by grinding the crumb polymer with dry ice.

A second batch polymerization (Example 4) was conducted with a mixed solvent of toluene (50 weight percent) and heptane (50 weight percent). The metering rate of mixed monomers was increased to 42 pounds per hour (1.4 hours metering time). The copolymer obtained a yield of 71% (61 lbs) with an average particle size of 0.8 mm. The characteristics of the resultant polymers in Examples 3 and 4 are set forth in Table III.

TABLE III

| | Example 3 | Example 4 |
|---|---|---|
| Wt. % of ECH in Copolymer | 24 | 27 |
| Tg, °C. by DSC | −53 | −51 |
| Mooney Viscosity (ML-4 @ 100° C.) | 80 | 70 |
| Mw by GPC | $7.9 \times 10^4$ | $1.3 \times 10^5$ |
| DSV | 1.4 | 2.9 |

EXAMPLES 5 & 6

A copolymer of epichlorohydrin and ethylene oxide was synthesized by a continuous process in a pilot plant scale. A mixed solvent (200 lbs) of toluene 48 weight percent) and heptane (52 weight percent) was charged into a 75-gallon reactor equipped with a mechanical stirrer. The reactor also included a cooling water reflux condenser and a cooling jacket. The reactor was heated to 110° C., and pressure was controlled at 20 psig. The catalyst with AcAc/TEAL ratio of 0.25 (65 lbs) in toluene was added along with the mixed monomers (85 pounds) of epichlorohydrin (15% by weight) and ethylene oxide (85% by weight) at a rate of 42 pounds per hour (2 hour meter time). Once all monomers were added, continuous feeds began with a rate of mixed solvent at 66 pounds per hour, mixed monomers at 28 pounds per hour and catalyst in toluene at 21 pounds per hour. The liquid level of the reactor was controlled by intermittent transfer of the slurry to a 75-gallon blowdown tank and the residents time of the polymerization was targeted at 2.5 hours. When the blowdown tank was about half full, isopropanol (25 pounds) and toluene (10 pounds) containing 10 weight percent a hindered phenolic antioxidant was charged batch wise. The deactivated slurry was transferred to a 500 gallon storage tank. The continuous feeds were carried out for four hours. Copolymers were obtained after filtering the slurry and washing, drying, and grinding the polymers as described in Examples 3 and 4. An average of 85% monomer conversion was achieved. Properties of the copolymer obtained are set forth below:

| Wt. % of ECH in Polymer | 15 |
|---|---|
| Tg, °C. by DSC | −55 |
| Mooney Viscosity (ML-4 @ 100° C.)80 | 80 |
| Mw by GPC | $1.7 \times 10^5$ |
| DSV | 2.4 |
| Particle Size | 0.65 mm |

The copolymer was uniform, and the composition was close to the monomer feed composition, i.e., for the four samples taken at each hour, the weight percent epichlorohydrin ranged from 12 to 17 weight percent comparing to 15 weight percent in the monomer feed. The results are set forth below.

| Polymerization Time in Hrs | 1 | 2 | 3 | 4 |
|---|---|---|---|---|
| Wt. % of ECH in Polymer | 15 | 17 | 12 | 14 |
| Tg, °C. by DSC | −54 | −54 | −55 | −54 |

A second run (Example 6) was carried out in the same manner with a mixed monomer of ECH (20 weight percent) and EO (80 weight percent). An average of 88% monomer conversion was achieved. The copolymer had a Mooney viscosity of ML-4=55 @100° C. and a particle size of about 0.79 mm. Again the copolymer was uniform and the composition was close to the monomer feed composition. The polymer contained 18 weight percent ECH and the monomer feed was 20 weight percent ECH.

| Polymerization Time in Hrs | 1 | 2 | 3 |
|---|---|---|---|
| Wt. % of ECH in Polymer | 18 | 18 | 18 |
| Tg, °C. by DSC | −54 | −54 | −54 |

EXAMPLE 7

In this example, the effect of the amount of ECH monomers in EO/ECH copolymers on the physical properties was examined and summarized in Table IV. As the amount of ECH monomer in copolymers decreases, the copolymers change from amorphous to semicrystalline to highly crystalline polymers and behave as elastomers, semi-thermoplastics (more like thermoplastic elastomers) to highly crystalline thermoplastics.

The crystallinity of copolymers of EO/ECH was determined by DSC analysis to measure their melting point (Tm) and heat of fusion (ΔH) was measured in cal/g with a Perkin-Elmer DSC-2 Differential Scanning Calorimeter at 10° C./min. heating or cooling rate under a 20 c.c./min. helium purge. The crystallinity index of copolymers was also examined by X-ray diffraction analysis.

The temperature dependent viscoelastic properties of the copolymers were examined with a Rheometrics Mechanical Spectrometer from room temperature (25° C.) to 230° C. with a rate of specimen deformation (oscillation frequency) at 1 rad/sec. The measured viscoelastic properties include the complex viscosity /η*/, the storage modulus G', the loss modulus G", and the loss tangent, tan $\epsilon$=G"/G'. The storage modulus G' is a measure of elastic nature of material, i.e. related to the energy stored by the material during a deformation and returned in the form of mechanical energy after a deformation. The loss modulus G" is a measure of the amount of energy dissipated during sample deformation. The loss tangent, tan $\epsilon$, reflects the dominant type of response, i.e. for a loss tangent less than one, the material behaves as a rubber; for a tangent greater than one, the material behaves as a viscous fluid. Copolymers of this invention display a sharp property transition at temperature from 35° to 65° C. Both complex viscosity and the storage modulus, undergo very rapid reductions in magnitude with increasing temperature. Also the loss modulus displays a sharp maximum. This behavior is characteristic of the melting of well-defined crystalline domains of thermoplastics. At temperatures above 70° C., the behavior of copolymers of this invention is characteristically elastomeric. The decrease of complex viscosity and the storage modulus become less sensitive to temperature increase and the loss tangent is less than one. On the other hand, EO/ECH copolymer (Hydrin 200) with ECH of about 68% by weight shows no thermoplastic behavior. It shows no melting point nor heats of fusion by DSC analysis, and no crystallinity by X-ray analysis, and no sharp reduction of the complex viscosity or the storage modulus or a sharp maximum of the loss modulus for the entire temperature studied for viscoelastic properties.

There is no way to predict the effect of those changes in the composition of copolymers on their antistatic performance.

TABLE IV

EFFECT OF ECH WT % ON THE PHYSICAL PROPERTIES OF COPOLYMERS OF ECH/EO

| ECH Wt % | Tm, °C. by DSC | ΔHf Cal/g | Crystallinity % | Complex Viscosity, Poise at 1 rad/s frequency | | | |
|---|---|---|---|---|---|---|---|
| | | | | 35° C. | 65° C. | 100° C. | 165° C. |
| 100 | none | 0 | 0 | n.d. | n.d. | n.d. | n.d. |
| 68 | none | 0 | 1 | $3.7 \times 10^6$ | $2.4 \times 10^6$ | $1.8 \times 10^6$ | $1.4 \times 10^6$ |
| 33 | 40 | 8 | 7 | $2.1 \times 10^7$ | $1.7 \times 10^6$ | $1.2 \times 10^6$ | $7.8 \times 10^5$ |
| 24 | 42 | 11 | 15 | $4.1 \times 10^7$ | $2.4 \times 10^6$ | $1.8 \times 10^6$ | $1.3 \times 10^6$ |
| 15 | 51 | 13 | 20 | $2.4 \times 10^8$ | $1.8 \times 10^6$ | $1.1 \times 10^6$ | $6.7 \times 10^5$ |
| 0 | 77 | 58 | 58 | $1.0 \times 10^9$ | $1.0 \times 10^8$ | $4.4 \times 10^6$ | $3.4 \times 10^6$ |

EXAMPLE 8

In this example, antistatic EO/ECH copolymers were examined for rigid PVC injection molding compounds. The PVC compound is composed of

| | |
|---|---|
| PVC homopolymer | 100 parts |
| Impact modifier | 12 parts |
| Processing aid | 2 parts |
| Stabilizer | 2 parts |
| Stearic acid | 0.5 parts |

The mixing of PVC compound with EO/ECH copolymers was carried out at 170° C. for 3 minutes with a laboratory Brabender mixer. Then a sheet sample of 6"×6" and ⅛"-1/16" thick was pressed out from a mold at 175° C. at $3 \times 10^5$ psi for 2 minutes. The following antistatic EO/ECH copolymers of this invention were examined:

Antistat A as described in Example 5
Antistat B as described in Example 3
Antistat C as described in Example 4

The results of antistatic properties of samples composed of 75 parts of PVC compounds containing 6.5 parts of EO/ECH copolymers (10 wt % to PVC) are shown in Table V as Examples 8A to 8G. All samples containing EO/ECH copolymers with the higher amount of EO monomers of this invention show surface resistivities less than $10^{13}$ ohm/sq and static decay rates less than 0.5 seconds without any detrimental effect visually examined. Furthermore, antistatic properties of PVC compounds containing EO/ECH copolymers with higher amount of EO monomer of this invention are significantly improved compared with those of PVC compounds containing commercial EO/ECH copolymers (Hydrin® 200) with lower amount of EO monomer as previously disclosed. The improvement makes the PVC compounds containing EO/ECH copolymers of this invention applicable for broader applications.

TABLE V

ANTISTATIC PROPERTIES OF PVC COMPOUNDS

| Example No. | Antistat | EO Wt. % | Comment | Wt. % Antistat | Surface Resistivity Ohm/sq. | Decay Rate (10% Cut) in Sec | Detrimental Effect |
|---|---|---|---|---|---|---|---|
| CONTROL | | | | | | | |
| 8A | NONE | — | Control | 0.0 | >1.0E + 16 | Insulator | None |
| 8B | NONE | — | Control | 0.0 | >1.0E + 16 | Insulator | None |
| EO/ECH COPOLYMERS | | | | | | | |
| 8C | EO/ECH | 85 | Antistat A | 10.0 | 2.40E + 12 | 0.16 | None |
| 8D | EO/ECH | 85 | Antistat A | 10.0 | 4.80E + 12 | n.d | None |
| 8E | EO/ECH | 76 | Antistat B | 10.0 | 1.90E + 12 | 0.32 | None |
| 8F | EO/ECH | 73 | Antistat C | 10.0 | 2.80E + 12 | 0.32 | None |
| 8G | EO/ECH | 30 | Hydrin 200 | 10.0 | 1.90E + 14 | 8.20 | None |
| COMMERCIAL AND COMPARATIVE ANTISTATS EO HOMOPOLYMERS | | | | | | | |
| 8H | EO | 100 | Antistat D | 10.0 | 4.40E + 14 | Insulator | None |
| 8I | EO | 100 | Commercial | 10.0 | 1.00E + 14 | Insulator | None |
| COMMERCIAL NON-IONIC ANTISTATS | | | | | | | |
| 8J | NONIONIC | — | MARKSTAT AL-15 | 10.0 | 3.10E + 15 | Insulator | C (L Yellow) |
| 8K | NONIONIC | — | MARKSTAT AL-15 | 3.5 | 8.80E + 15 | Insulator | None |
| 8L | POLYETHER | — | MARKSTAT AL-14 | 10.0 | 2.90E + 15 | Insulator | B.C (L Yellow) |
| COMMERCIAL ANTISTATS OF AMINES AND AMIDES | | | | | | | |
| 8M | AMINE | 89 | ETHOMEEN 18/60 | 10.0 | 7.80 + 12 | Insulator | C (Yellow) |
| 8N | AMINE | 89 | ETHOMEEN 18/60 | 5.0 | >1.0E + 16 | Insulator | C (L Yellow) |
| 8O | AMINE | 71 | ETHOMEEN 18/25 | 5.0 | n.d. | n.d. | C (Black) |
| 8P | AMINE | 62 | ETHOMEEN 18/20 | 5.0 | n.d. | Insulator | C (Yellow) |
| 8Q | AMINE | 45 | ETHOMEEN 18/15 | 5.0 | 1.50E + 12 | 0.45 | C (Dark Yellow) |
| 8R | AMINE | 25 | ETHOMEEN 18/12 | 5.0 | 6.80E + 11 | 0.11 | C (Yellow) |
| 8S | AMINE | 25 | KEMAMINE AS-974/1 | 10.0 | 3.60E + 10 | 0.08 | C (Dark Yellow) |
| 8T | AMINE | 25 | KEMAMINE AS-974/1 | 5.0 | 1.00E + 13 | Insulator | C (Dark Yellow) |
| 8U | AMINE | 25 | KEMAMINE AS-990 | 5.0 | 6.50E + 12 | 0.84 | C (Yellow) |
| 8V | AMIDE | 65 | ETHMID HT/23 | 5.0 | 2.20E + 14 | Insulator | C (L Yellow) |
| 8W | AMIDE | 89 | ETHMID HT/60 | 5.0 | 1.0E + 16 | Insulator | C (Yellow) |
| 8X | AMIDE | 31 | ONYXOL 345 | 10.0 | 3.40E + 09 | 0.01 | S.C (D. Yellow) |
| 8Y | AMIDE | 31 | ONYXOL 345 | 5.0 | 6.90E + 09 | 0.01 | S.C (D. Yellow) |
| COMMERCIAL ANTISTATS OF PHOSPHATES | | | | | | | |
| 8Z | PHOSPHATE | — | TRYFAC 5559 | 5.0 | 2.20E + 13 | 1.50 | C (Orange) |
| COMMERCIAL ANTISTATS OF QAUT SALTS | | | | | | | |
| 8AA | QUAT | — | MARKSTAT AL-33 | 3.5 | 2.40E + 12 | 0.35 | C (L Yellow) |

TABLE V-continued

ANTISTATIC PROPERTIES OF PVC COMPOUNDS

| Example No. | Antistat | EO Wt. % | Comment | Wt. % Antistat | Surface Resistivity Ohm/sq. | Decay Rate (10% Cut) in Sec | Detrimental Effect |
|---|---|---|---|---|---|---|---|
| 8AB | QUAT | — | MARKSTAT AL-33 | 2.5 | 8.30E + 12 | 1.78 | C (L Yellow) |
| 8AC | QUAT | — | MARKSTAT AL-12 | 3.5 | n.d. | n.d. | C (Black) |
| 8AD | QUAT | — | LANOQUAT 1756 | 5.0 | 2.50E + 11 | 0.07 | C (Orange) |
| 8AE | QUAT | — | CYASTAT LS | 3.5 | 1.10E + 09 | 0.01 | C (L Yellow) |
| 8AF | QAUT | — | CYASTAT 609 | 3.5 | 5.90E + 11 | 0.18 | C (L Yellow) |

(a) Detrimental Effect: B = Brittle, C = Color (stability problems), and S = surface problems (marbleized or [and] oily)

For the purposes of comparison, homopolymers of ethylene oxide were also examined at 10 wt % of PVC in PVC compound. In Example 8H, a homopolymer of antistat D from Example 11 was examined; in Example 8I, a commercial homopolymer of ethylene oxide obtained from Polysciences, Inc. with a molecular weight of $5 \times 10^6$ was examined. Both homopolymers show no significant improvement over Hydrin 200.

For the purpose of comparison, commercial non-ionic antistats were also examined (Examples 8J-8L). Non-ionic antistats were obtained from Argus Chemical Division of Witco Chemical Co. under a trade name of Markstat ®. They are commercial antistats for rigid or plasticized PVC:

Markstat AL-15—an alky ethoxylate blend

Markstat AL-14—a polyether

Both Markstat AL-15 and AL-14 show less effective antistatic properties than EO/ECH copolymers of this invention.

For the purposes of comparison, commercial antistats of ethoxylated long chain amines and amides were examined (Example 8M to 8Y). Ethoxylated amines with varied amounts of EO units were obtained from Akzo Chemie America under a trade name of Ethomeen ® and bis(ethanol)alkyl amines were obtained from Humko Chemical Division of Witco Chemical Corp. under a trade name of Kemamine ®. Ethoxylated alkyl amines are well-known effective antistats for polyolefins. Ethoxylate amides were obtained from Akzo Chemie America under a trade of Ethmid ® and from Onyx Chemical Co. under a trade name of Onyxol ®. All samples containing ethoxylated long chain amines and amides were discolored and indicate the decomposition of PVC compounds.

For comparison purposes, a commercial antistat phosphate was examined (Example 8Z). Antistatic phosphate was obtained from Emery Chemicals Co. under a trade name of Tryfac ®. Antistat Tryfac 5559 causes a stability problem with the PVC compound as indicated by discoloration.

For comparison Purposes, commercial antistats of quaternary ammonium salts were also examined (Examples 8AA-8AH). Quaternary ammonium salts were obtained from Argus Chemical Division of Witco Chemical Co. under the trade name of Markstat ® and from American Cyanomide Co. under the trade name of Cyastat ®. Cyastat antistats are claimed to be more heat stable. All samples of PVC compounds containing quaternary ammonium salts show discoloration.

The effect of antistats on the stability of PVC compounds was further examined by thermogravimetric analysis because most commercially available antistats adversely affect the stability of PVC. The incorporation of antistatic EO/ECH copolymers of this invention into PVC compound does not lower the temperature at maximum rate of weight loss as determined by thermogravimetric analysis (Table VI). On the other hand, the incorporation of antistatic amines or quaternary ammonium salts damaged the stability of PVC Compounds and lowered the temperature of the maximum rate of weight loss by more than 25° C.

TABLE VI

THERMOGRAVIMETRIC ANALYSIS OF ANTISTATIC PVC COMPOUNDS

| Antistat | Type | Wt. % | °C. at Maximum Rate of Weight Loss |
|---|---|---|---|
| Control | — | — | 291 |
| Antistat A | EO/ECH | 10 | 310 |
| Antistat B | EO/ECH | 10 | 304 |
| Kemamine AS-900 | Amine | 5.0 | 254 |
| Kemamine AS-974/1 | Amine | 5.0 | 257 |
| Markstat AL-33 | Quat | 3.5 | 265 |
| Ethomeen 18/15 | amine | 5.0 | 245 |
| Ethomeen 18/12 | amine | 5.0 | 249 |
| Lanoquat 1756 | Quat | 5.0 | 260 |

EXAMPLE 9

In this example, a varied amount of antistatic EO/ECH copolymers were incorporated with PVC compounds with a Brabender mixer as described in Example 8. Antistatic properties of PVC compounds with varied amounts of EO/ECH copolymers of this invention are shown in Table VII. As the amount of EO/ECH copolymer increases, antistatic PVC compounds become more conductive and antistatic properties improved to fit various applications requiring different degrees of conductivity.

TABLE VII

| Example No. | Antistat | EO Wt. % | Comment | Wt. % Antistat | Surface Resistivity Ohm/sq. | Decay Rate (10% Cut) in Sec |
|---|---|---|---|---|---|---|
| 9A | EO/ECH | 85 | Antistat A | 10.0 | 4.80E + 12 | n.d. |
| 9B | EO/ECH | 85 | Antistat A | 10.0 | 2.40E + 12 | 0.16 |
| 9C | EO/ECH | 85 | Antistat A | 5.0 | 2.80E + 14 | Insulator |
| 9D | EO/ECH | 85 | Antistat A | 3.5 | 5.60E + 15 | Insulator |
| 9E | EO/ECH | 76 | Antistat B | 25.0 | 4.80E + 11 | 0.02 |
| 9F | EO/ECH | 76 | Antistat B | 20.0 | 8.00E + 11 | 0.02 |
| 9G | EO/ECH | 76 | Antistat B | 15.0 | 2.10E + 12 | 0.04 |
| 9H | EO/ECH | 76 | Antistat B | 10.0 | 1.90E + 12 | 0.32 |
| 9I | EO/ECH | 76 | Antistat B | 7.5 | 5.80E + 13 | 3.30 |

TABLE VII-continued

| Example No. | Antistat | EO Wt. % | Comment | Wt. % Antistat | Surface Resistivity Ohm/sq. | Decay Rate (10% Cut) in Sec |
|---|---|---|---|---|---|---|
| 9J | EO/ECH | 76 | Antistat B | 5.0 | 5.20E + 14 | Insulator |
| 9K | EO/ECH | 73 | Antistat C | 10.0 | 2.80E + 12 | 0.32 |
| 9L | EO/ECH | 73 | Antistat C | 3.5 | 4.80E + 15 | Insulator |

EXAMPLE 10

In this example, antistatic EO/ECH copolymers of this invention were examined with PVC compound described in Example 8 by injection molding. In a large Banbury mixer, 2912.5 parts of PVC compound was mixed with 250 parts of antistat of this invention. Mixing was terminated when the Brabender temperature reached 300° F. The mixture was then rolled by a miller twice at 310° F. to form a 0.14" thick sheet. Subsequently, $\frac{1}{8}$" cubic pellets were obtained with a screen granulator and test samples were obtained by injection molding.

Physical properties of injection molded antistatic PVC compounds are shown in Table VIII. All tests were carried out according to ASTM procedures, except the Brabender Dynamic Thermal Stability Test. In Brabender Dynamic Thermal Stability Test, the compound was placed in a Brabender mixer and mixed at 190° C. at 85 rpm. Samples were pinched every two minutes and the mixing times of the development of light yellow color (early color) and black color were compared. Significant higher or lower torque at 20 min. mixing time will indicate the crosslinking or degradation of the compound, respectively. As shown in Table VIII PVC compounds containing antistatic EO/ECH copolymers of this invention maintain good physical properties and stability. No significant detrimental effects were observed.

TABLE VIII

PROPERTIES OF ANTISTATIC PVC COMPOUNDS

| | ASTM Proc. No. | Example No. 10A | Example No. 10B | Example No. 10C |
|---|---|---|---|---|
| Antistat Type | | None Control | Antistat A | Antistat B |
| EO % | | | 85 | 76 |
| wt % | | 0 | 10 | 10 |
| Surface resistivity, ohm/sq | D-275 | >1.0E + 16 | 3.0E + 13 | 2.0E + 13 |
| Specific Gravity, | D-792 | 1.33 | 1.32 | 1.32 |
| Melt Index, g/10 min., 190° C., 21,600 g, 0.25 min. | D/1238 | 32 | 35 | 33 |
| Tensile Properties | D-638 | | | |
| Strength at Yield, psi × 1000 | | 6.2 | 5.5 | 5.4 |
| Stress at Break, psi × 1000 | | 6.2 | 5.4 | 5.4 |
| Modulus of Elasticity psi × 100,000 | | 4.4 | 3.7 | 3.7 |
| % Elongation | | 125 | 110 | 95 |
| Flexural Properties | D-790 | | | |
| Strength, psi × 1000 | | 11.6 | 9.8 | 9.6 |
| Modulus, psi × 100,000 | | 3.8 | 3.4 | 3.3 |
| | ASTM Proc. No. | Example No. 10 8A | Example No. 10 8B | Example No. 10 8C |
| Izod Impact (Method A) ft-lb/in. | D-256 | 17.9 | 14.9 | 15.5 |
| Durometer Hardness, "D" ASTM D-2240 | D-2240 | 85 | 79 | 80 |
| Rockwell hardness, "R" | D-785 | 105 | 91 | 91 |
| Heat Distortion °C. at 264 psi | D-648 | 67 | 65 | 66 |
| Vicat Softening Pt., °C. 2° C./min | D-1525 | 80 | 80 | 81 |
| Brabender Dynamic Thermal Stability Test 190° C., 85 rmp | None | | | |
| Early Color, min | | 4 | 5 | 8 |
| Black Color, min. | | 23 | 22+ | 22+ |
| 20 min Torque | | 998 | 1000 | 996 |

EXAMPLE 11

In this example, antistatic EO/ECH copolymer was examined with chlorinated polyvinyl chloride (CPVC). 80 parts by weight of Temprite ® CPVC 3504 or 88981 was mixed with 20 parts by weight Antistat B in a Brabender mixer at 190° C. for 3 min. Then a sheet was pressed in a mold at 180° C. for 1 min.

Temprite CPVC 3504 show a surface resistivity of $1.1 \times 10^{13}$ ohm/sq. Temprite CPVC 88981 show a surface resistivity of $4.4 \times 10^{13}$ ohm/sq. Both Temprite CPVC thermoplastics without antistat show surface resistivity greater than $10^{15}$ ohm/sq.

EXAMPLE 12

In this example, antistatic EO/ECH copolymers were examined with PVC compound for blow molding. Geon 87444 PVC compound is a high impact blow molding compound designed for use in general purpose applications. It is a suitable bottle compound for cosmetic, toiletry, industrial, and household chemical packaging.

The mixing of PVC compound with EO/ECH copolymers was carried out at 180° C. for 3 minutes with a laboratory Brabender mixer. Then a sheet sample of 6"×6" and 1/16" thick was pressed out from a mold at 185° C. at 3×10$^5$ psi for 2 minutes.

Table IX shows the results of antistatic and physical properties of PVC compound for general purpose blow molding containing semicrystalline antistatic EO/ECH copolymer of this invention. For comparison purposes, /ECH copolymers of this invention. The incorporation of EO/ECH copolymers of this invention show significant improvement on antistatic properties of Blendex ® 131. For comparison purposes, Table X also shows the results of antistatic properties of Blendex ® 131 containing commercial amorphous EO/ECH copolymer (Hydrin 200) with a lower amount of EO monomer as previously disclosed, and a commercial homopolymer of ethylene oxide, Kemamine AS—274/1, and Amostat 410 as described in Example 7. None of the comparative antistats are as effective as the EO/ECH copolymers of this invention.

TABLE X

ANTISTATIC PROPERTIES OF BLENDEX 131 ABS RESIN

| Example No. | Antistat | Type | EO Wt. % | Wt. % of Antistat | Surface Resistivity Ohm/sq. |
|---|---|---|---|---|---|
| 13A | Control | None | — | — | >1.0E + 16 |
| 13B | Antistat A | EO/ECH | 85 | 10 | 3.0E + 13 |
| 13C | Antistat B | EO/ECH | 76 | 10 | 1.5E + 13 |
| 13D | Antistat C | EO/ECH | 73 | 10 | 7.6E + 13 |
| 13E | Hydrin 200 | EO/ECH | 32 | 10 | 2.0E + 15 |
| 13F | Hydrin 100 | ECH | 0 | 10 | >1.0E + 16 |
| 13G | Antistat D | EO | 100 | 10 | 1.1E + 15 |
| 13H | Kemamine AS-974/1 | Amine | — | 5 | 3.5E + 15 |
| 13I | Armostat 410 | Amine | — | 5 | 3.6E + 15 |

Table IX also shows the results of PVC compounds containing commercial amorphous EO/ECH copolymer (Hydrin 200) with a lower amount of EO monomer.

EO/ECH copolymers are effective antistats for PVC compound for general purpose blow molding. Furthermore, antistatic properties of PVC compounds containing semicrystalline EO/ECH copolymer with a higher amount of EO monomer are significantly improved compared with those of PVC compounds containing amorphous EO/ECH copolymer (Hydrin 200) with a lower amount of EO monomer.

EXAMPLE 14

In this example, antistatic EO/ECH copolymers of this invention were examined with ABS thermoplastic. Cycolac T ®, obtained from Borg-Warner Chemicals, Inc., is an ABS thermoplastic for general purpose injection molding. The mixing of Cycolac T with antistats was carried out at 190° C. for 3 minutes with a Brabender mixer.

Table XI shows the results of antistatic and physical properties of Cycolac T containing semicrystalline antistatic EO/ECH copolymers of this invention. For com-

TABLE IX

ANTISTATIC AND PHYSICAL PROPERTIES OF ANTISTATIC PVC COMPOUND FOR GENERAL PURPOSE BLOW MOLDING

| Example No. | 12A | 12B | 12C | 12D | 12E |
|---|---|---|---|---|---|
| Antistat | CONTROL | HYDRIN 200 | Antistat C | HYDRIN 200 | Antistat C |
| Type | — | EO/ECH | EO/ECH | EO/ECH | EO/ECH |
| EO % | — | 32 | 73 | 32 | 73 |
| wt % | — | 10 | 10 | 15 | 15 |
| Surface resistivity, ohm/sq | >1.0E + 15 | 3.7E + 13 | 2.6E + 12 | 1.3E + 13 | 1.0E + 12 |
| Decay rate at 10%, sec | Insulator | 0.52 | 0.39 | 0.14 | 0.03 |
| Flexural Tests, ASTM D-790 | | | | | |
| Modulus, psi × 1000 | 418 | 338 | 328 | 302 | 270 |
| Strength, psi × 1000 | 11.1 | 8.8 | 8.1 | 7.9 | 6.4 |
| Heat Distortion, ASTM D-648 °C. at 264 psi | 67 | 67 | 66 | 67 | 67 |
| Tensile, ASTM D-638 | | | | | |
| Strength at break, psi × 1000 | 6.5 | 5.0 | 4.6 | 4.2 | 3.9 |
| Modulus, psi × 100,000 | 4.0 | 3.0 | 3.1 | 2.7 | 2.8 |
| durometer hardness, "D" ASTM D-2240 | 82 | 80 | 76 | 77 | 73 |

EXAMPLE 13

In this example, antistatic EO/ECH copolymers of this invention were examined with ABS thermoplastic. Blendex ® 131, obtained from Borg-Warner Chemicals, Inc., is an ABS resin used for calendered sheet applications and as modifier for PVC compounds.

Table X shows the results of antistatic properties of Blendex 131 containing semicrystalline antistatic EO- parison purposes, Table XI also shows the results of Cycolac T containing commercial amorphous EO/ECH copolymer (Hydrin 200).

EO/ECH copolymers are effective antistats for Cycolac T. Semicrystalline EO/ECH copolymers of this invention at 10 phr give antistatic properties equivalent to amorphous Hydrin 200 with a lower EO content at 20 phr.

TABLE XI

PROPERTIES OF ANTISTATIC CYCOLAC T
(GENERAL PURPOSE INJECTION MOLDING ABS)

| EXAMPLE NO. | 14A | 14B | 14C | 14D | 14E |
|---|---|---|---|---|---|
| Antistat ID | Control | EO/ECH Hydrin 200 | EO/ECH Antistat B | EO/ECH Antistat E | EO/ECH Antistat F |
| EO % | | 32 | 76 | 79 | 83 |
| WT % | | 10 | 10 | 10 | 10 |
| Surface Resistivity, ohm/sq | >1.0E + 16 | 2.1E + 15 | 5.8E + 13 | 1.9E + 13 | 1.8E + 14 |
| Flexural Tests, ASTM D-790 | | | | | |
| Modulus, psi × 1000 | 362 | 308 | 310 | 304 | 299 |
| Strength, psi × 1000 | 10.5 | 8.5 | 6.9 | 6.2 | 6.5 |
| Load at Yield, lbs | | | | | |
| Heat Distortion, ASTM D-648 °C. at 264 psi | 83 | 78 | 82 | 82 | 79 |
| Izod Impact, ASTM D-256 ft-lb/in of notch | n.d. | 4.4 | 4.00 | 2.10 | 3.30 |

| EXAMPLE NO. | 14F | 14G | 14H | 14I |
|---|---|---|---|---|
| Antistat ID | EO/ECH Hydrin 200 | EO/ECH Antistat B | EO/ECH Antistat E | EO/ECH Antistat F |
| EO % | 32 | 76 | 79 | 83 |
| WT % | 20 | 20 | 20 | 20 |
| Surface Resistivity, ohm/sq | 8.0E + 13 | 2.6E + 12 | 6.5E + 12 | 5.9E + 12 |
| Flexural Tests, ASTM D-790 | | | | |
| Modulus, psi × 1000 | 257 | 246 | 256 | 236 |
| Strength, psi × 1000 | 6.6 | 4.5 | 4.9 | 4.0 |
| Load at Yield, lbs | | | 13.4 | 11.7 |
| Heat Distortion, ASTM D-648 °C. at 264 psi | 78 | 80 | 80 | 82 |
| Izod Impact, ASTM D-256 ft-lb/in of notch | 3.4 | 2.00 | 3.50 | 2.0 |

EXAMPLE 15

In this example, an antistatic EO/ECH copolymer of this invention was examined with ABS thermoplastic. Cycolac ® L, obtained from Borg-Warner Chemicals, Inc., is high impact ABS resin for injection molding. The mixing of Cycolac L with various antistats was carried out at 190° C. for 3 minutes with a Brabender mixer.

Table XII shows the results of antistatic and Physical properties of Cycolac L containing antistats. The EO-/ECH copolymers of the present invention (Antistat B) are effective antistats for Cycolac L. The EO/ECH copolymers of this invention give significantly better antistatic properties compared with an amorphous EO-/ECH copolymer (Hydrin 200) containing lower amounts of EO monomer.

TABLE XII

PROPERTIES OF ANTISTATIC CYCOLAC L
(HIGH IMPACT ABS)

| | 15A | 15B | 15C |
|---|---|---|---|
| Antistat ID | Control | EO/ECH Antistat B | EO/ECH Hydrin 200 |
| EO % | 0 | 76 | 32 |
| WT % | | 20 | 20 |
| Surface Resistivity, ohm/sq | 1.0E + 16 | 2.8E + 11 | 4.4E + 13 |
| Flexural Tests, ASTM D-790 | | | |
| Modulus, psi × 1000 | 274 | 170 | — |
| Strength, psi × 1000 | 8.1 | 4.0 | — |
| Heat Distortion, ASTM D-648 C at 264 psi | 79 | 73 | — |
| Izod Impact, ASTM D-256 ft-lb/in of notch | 7.70 | 5.80 | — |
| Tensile, ASTM D-638 | | | |
| Strength at break, psi × 1000 | 4.6 | 4.5 | — |
| Modulus, psi × 100,000 | 2.5 | 3.3 | — |

EXAMPLE 16

In this example, antistatic EO/ECH copolymer of this invention was examined with polystyrene and related polymers. Styron ® 420, obtained from Dow Chemical Co., is a polystyrene. Cosden ® 945, obtained from Cosden Oil and Chemical Co., is a high impact injection molding polystyrene. Cadon ® 127, obtained from Monsanto, is a styrene-maleic anhydride terpolymer. Noryl ® PC180, obtained from General Electric Co., is a polystyrene modified polyphenylene oxide 15 parts of antistat C with 73 wt. % of EO was blended into 85 parts of the above polymers at 190° C. for 3 minutes with a Brabender mixer.

Table XIII shows the results of antistatic properties of polystyrene and related Polymers. All polymers containing 15 wt. % of antistatic C show surface resistivities about $10^{12}$ ohm/sq; those polymers without antistat show surface resistivities greater than $10^{15}$ ohm/sq.

TABLE XIII

Antistatic Properties of Polystyrene and Related Polymers

| | Surface Resistivity ohm/sq. |
|---|---|
| Polystyrene (Styron 420) | $4.2 \times 10^{12}$ |
| High Impact Polystyrene (Cosden 945) | $6.1 \times 10^{12}$ |
| Styrene-Maleic Anhydride Terpolymer (Cadon 127) | $4.6 \times 10^{12}$ |
| Modified Polyphylene Oxide (Noryl PC180) | $4.2 \times 10^{12}$ |

EXAMPLE 17

In this example, Permanence of antistatic EO/ECH copolymers of this invention was examined. Antistatic properties of several PVC compounds of Examples 9 were remeasured after 10 months of storage time. The results are shown in Table XIV.

In most cases the surface resistivity and the decay rate does not charge drastically.

TABLE XIV

| | | Permanence of Antistatic Properties | | | |
| | | Wt. % of | Surface Resistivity, ohm/sq | | Decay Rate in Sec. |
| Antistat | EO Wt. % | Antistat | Initial | Stored | Initial | Stored |
|---|---|---|---|---|---|---|
| B | 76 | 20 | $8.0 \times 10^{11}$ | $3.2 \times 10^{12}$ | 0.02 | 0.02 |
| B | 76 | 15 | $2.1 \times 10^{12}$ | $5.5 \times 10^{12}$ | 0.04 | 0.02 |
| B | 76 | 10 | $1.6 \times 10^{13}$ | $2.9 \times 10^{13}$ | 0.22 | 0.20 |

Thus it is apparent that there has been provided, in accordance with the invention, a semicrystalline antistatic copolymer of EO/ECH for PVC and/or other chlorine containing polymers and for ABS and/or other polymers containing styrene and acrylonitrile that fully satisfies the objects, aims, and advantages set forth above. While the invention has been described in conjunction with specific embodiments thereof, it is evident that many alteratives, modifications, and variations will be apparent to those skilled in the art in light of the foregoing description. Accordingly, it is intended to embrace all such alternatives, modifications, and variations as fall within the spirit and broad scope of the present invention.

What is claimed is:

1. An antistatic polymeric composition comprising a mixture of:
   (a) a semicrystalline, antistatic copolymer additive of ethylene oxide and an epihalohydrin wherein the semicrystalline antistatic copolymer additive contains at least 60% by weight ethylene oxide, has an inherent viscosity as determined in 100 g of toluene at 25° C. in the range of about 0.2 ml/g to about 15.0 ml/g, and a heat of fusion in the range from about 3 calories per gram to about 25 calories per gram, said antistatic copolymer additive comprising from about 3% to about 20% by weight of the antistatic polymeric composition; and
   (b) a polymeric material selected from the class consisting of polyvinyl chloride, other chlorine containing polymers, and mixtures thereof wherein the polymeric material comprises from about 80% to about 97% by weight of the antistatic polymeric composition.

2. The antistatic polymeric composition of claim 1 wherein the semicrystalline antistatic copolymer additive comprises:
   ethylene oxide in an amount from about 80% to about 95% by weight; and
   epihalohydrin in an amount from about 5% to about 20% by weight of the antistatic copolymer additive.

3. The antistatic polymeric composition of claim 2 wherein said epihalohydrin is epichlorohydrin.

4. The antistatic polymeric composition of claim 3 which also includes one or more of the following components: processing aids, impact modifiers, heat distortion improvers, fire retardants, lubricants, colorants, inorganic pigments, fillers, particulate extenders, stabilizers, and plasticizers.

5. The composition of claim 1 wherein said other chlorine containing polymers comprise: polyvinylidene chloride, chlorinated polyethylene, and mixtures thereof.

6. The composition of claim 1 wherein said polyvinyl chloride is selected from the group consisting of vinyl chloride homopolymers, chlorinated polyvinyl chloride and vinyl chloride copolymers or terpolymers having vinyl chloride as the major component by weight.

7. A process for preparing an antistatic polymeric composition comprising the following steps:
   (a) providing a polymeric material selected from the class consisting of polyvinyl chloride, other chloride containing polymers, and mixtures thereof, and providing a semicrystalline, antistatic copolymer additive of ethylene oxide and an epihalohydrin wherein the semicrystalline, antistatic copolymer additive contains at least 60% by weight ethylene oxide, has an inherent viscosity as determined in 100 g of toluene at 25° C. in the range of 0.2 ml/g to about 15.0 ml/g, and a heat of fusion in the range from about 3 calories per gram to about 25 calories per gram; and
   (b) mixing said polymeric material and said semicrystalline, antistatic copolymer additive such that the resulting mixture is a uniform antistatic polymeric composition comprising from about 80% to about 97% by weight polymeric material and from about 3% to about 20% by weight semicrystalline, antistatic copolymer additive.

8. The process of claim 7 wherein the semicrystalline, antistatic copolymer additive contains ethylene oxide in an amount from about 80% to about 95% by weight and epihalohydrin in an amount from about 5% to about 20% by weight of the antistatic copolymer additive.

9. The process of claim 8 wherein said epihalohydrin is epichlorohydrin.

10. The process of claim 9 wherein one or more of the following components: processing aids, impact modifiers, heat distortion improvers, fire retardants, lubricants, colorants, inorganic pigments, fillers, particulate extenders, stabilizers and plasticizers are mixed with the antistatic polymeric composition.

11. The process of claim 7 wherein said other chlorine containing polymers are selected from the group consisting of polyvinylidene chloride, chlorinated polyethylene, and mixtures thereof.

12. The process of claim 7 wherein said polyvinyl chloride is selected from the group consisting of vinylchloride homopolymers, chlorinated polyvinyl chloride and vinyl chloride copolymers and terpolymers having vinyl chloride as the major component by weight.

* * * * *